Feb. 13, 1934.    A. F. MASURY    1,946,749
STEERING MECHANISM FOR INDIVIDUALLY SPRUNG WHEELS
Filed June 21, 1932    2 Sheets-Sheet 1
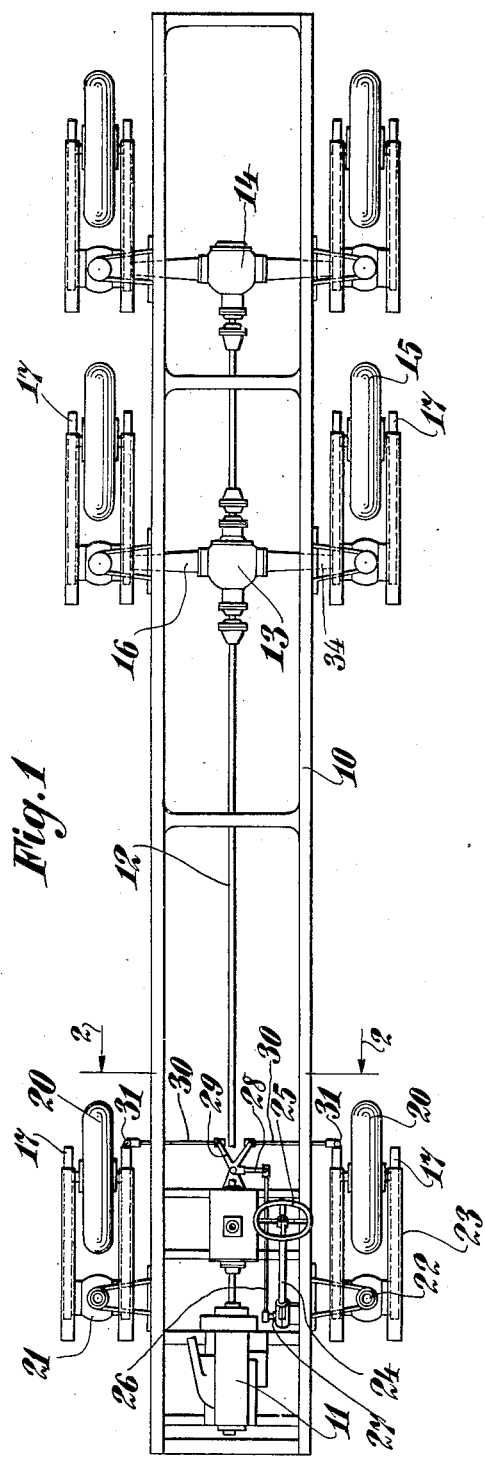
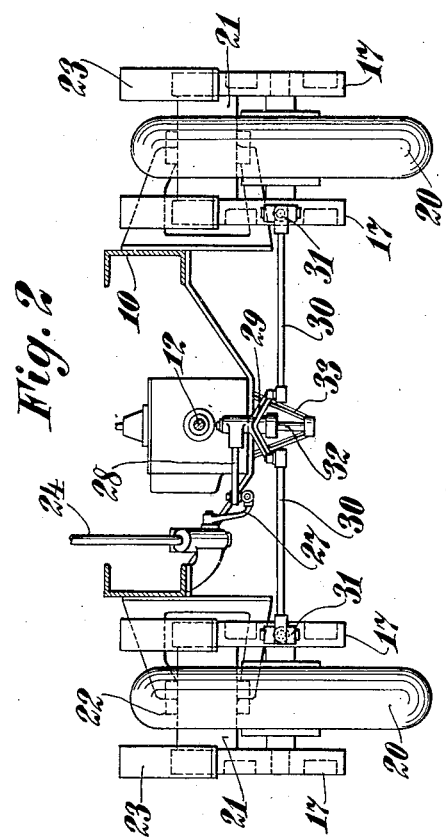
INVENTOR
*Alfred F. Masury,*
BY
*Redding, Greeley, O'Shea + Campbell*
HIS ATTORNEYS

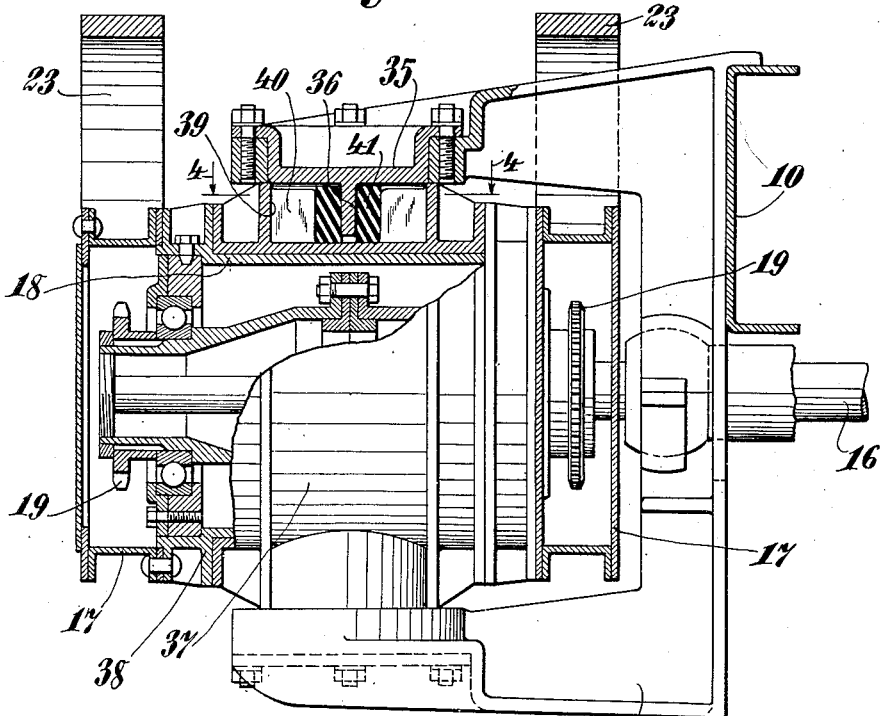
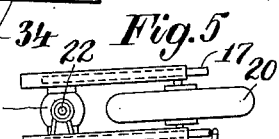
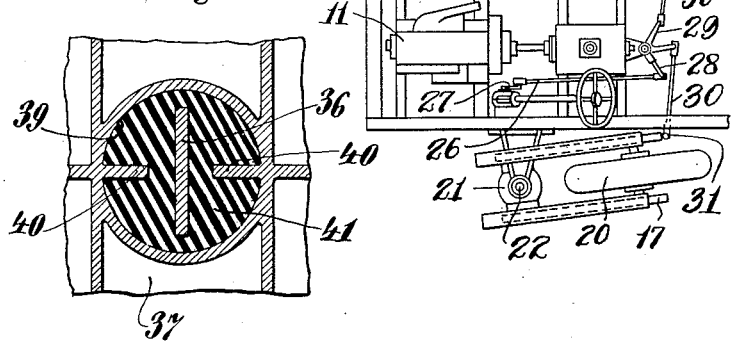

Patented Feb. 13, 1934

1,946,749

UNITED STATES PATENT OFFICE 1,946,749

STEERING MECHANISM FOR INDIVIDUALLY SPRUNG WHEELS

Alfred F. Masury, New York, N. Y., assignor to International Motor Company, New York, N. Y., a corporation of Delaware Application June 21, 1932. Serial No. 618,441

5 Claims. (Cl. 280—91)

The present invention relates to motor vehicles of the individually mounted wheel type and embodies, more specifically, an improved wheel mounting and steering mechanism for motor vehicles having more than four individually mounted wheels. The development of vehicles having individually mounted wheels has provided wheel mountings wherein individually mounted steering wheels are steered through a suitable connection at the point of connection thereof with the vehicle frame. The desirability of providing an effective steering connection of vehicles of this type wherein the rear wheels are mounted in such fashion as to be able to partake of a degree of swivelling action will be readily apparent and an object of the invention, accordingly, is to provide a steering mechanism for motor vehicles having individually mounted wheels wherein the forward steering wheels are effectively controlled for steering the vehicle, the rear or trailing individually mounted wheels being so mounted upon the vehicle frame as to partake of a degree of swivelling motion to enable the trailing wheels to track properly when the vehicle is turning a corner.

A further object of the invention is to provide an improved mounting for an individually mounted wheel whereby the same may be effectively mounted upon a vehicle frame with provision for a degree of swivelling or castor action upon the frame.

Further objects, not specifically enumerated above, will be apparent as the invention is described in greater detail in connection with the accompanying drawings, wherein:

Figure 1 is a plan view showing a vehicle frame provided with a plurality of individually mounted wheels and a steering mechanism constructed in accordance with the present invention.

Figure 2 is a view in section, taken on line 2—2 of Figure 1, and looking in the direction of the arrows.

Figure 3 is a detail view, partly broken away and in section, showing a device for mounting an individual wheel upon a vehicle frame.

Figure 4 is a view in section, taken on line 4—4 of Figure 3, and looking in the direction of the arrows.

Figure 5 is a plan view of the front end of the vehicle with the wheels moved into a position assumed during turning of the vehicle.

With reference to Figure 1, a vehicle frame is shown at 10 and is provided with an engine 11 and transmission shaft 12 which is adapted to supply power to rear differentials 13 and 14, respectively. From differentials 13 and 14, power is transmitted to rear driving wheels 15 by means of jack shafts 16.

Wheels 15 are individually mounted upon frame 10 by means of pairs of arms 17 which are formed with a common mounting structure 18 within which the respective jack shafts 16 extend. A suitable driving connection, such as chains and sprockets may be provided within arms 17 for transmitting power from driving sprockets 19 to the respective wheels 15.

At the forward end of the vehicle, steering wheels 20 are provided, such wheels also being individually mounted upon pairs of arms 17 which are formed upon mounting structures 21 which are of such construction as to permit pivotal movement of the wheels 20 and arms 17 in a vertical plane, as well as in a horizontal plane. Trunnions 22 may be provided to mount the wheels 20 and arms 17 for movement in horizontal planes and thus enable the same to be actuated to steer the vehicle. Springs 23 are provided to support the vehicle frame upon the respective wheels and a steering column 24 and steering wheel 25 are provided to effect the movement of wheels 20 to steer the vehicle. Drag link 26 is connected between a steering lever 27 and lever 28 which is formed upon steering arms 29. Steering arms 29 are connected to links 30 which are in turn connected at 31 to the ends of the inner arms 17 which mount the wheels 20 upon the vehicle frame. In order that movement of the wheels 20 in vertical planes may be accommodated, arms 29 are pivoted upon a vertical shaft 32 which is secured to a bracket 33 mounted upon the vehicle frame, the arms 29 thus being slidable vertically upon shaft 32.

Trailing driving wheels 15 are supported on the frame 10 by means of U-shaped brackets 34 which are provided with seating members 35 having webs 36 formed therein, extending inwardly as illustrated in Figure 3. Between the arms of member 34, mounting members 37 are provided to receive the ends of shaft 16. Sleeves 38 are journaled in the members 37 and are secured to the respective pairs of arms 17 to permit the swinging movement of the wheels 15 in vertical planes. On opposite sides of members 37, recesses 39 are formed, each recess having pairs of inwardly extending arms 40. Blocks of yielding non-metallic material 41 are mounted within the recesses 39, the blocks being formed with suitable recesses to receive the arms 40 and webs 36. In this fashion, movement of arms 17 in horizontal planes is resisted by the blocks of yielding non-metallic material 40, the latter serving to urge the arms normally into a central or straight-a-head position. These connections will thus be seen to permit a degree of swivelling motion of the trailing wheels and thus enable them to track more effectively during operation.

While the invention has been described with specific reference to the accompanying drawings, it is not to be limited, save as defined in the appended claims.

I claim as my invention:

1. A vehicle having, at each side a plurality of individually mounted rear wheels, a plurality of individually mounted forward wheels, means to mount the forward wheels for steering motion, means to steer the forward wheels, and means to mount the rear wheels to trail individually with provision for floating movement thereof in horizontal planes.

2. A vehicle having, at each side a plurality of individually mounted rear wheels, a plurality of individually mounted forward wheels, means to mount the forward wheels for steering motion, means to steer the forward wheels, means to mount the rear wheels to trail individually with provision for floating movement thereof in horizontal planes, and means to resist motion thereof in horizontal planes.

3. A vehicle having a plurality of individually mounted rear wheels, a plurality of individually mounted forward wheels, means to mount the forward wheels for steering motion, means to steer the forward wheels, and yielding non-metallic material mounting the forward wheel mounting means on the frame with provision for relative movement with respect thereto in horizontal planes.

4. A vehicle having a plurality of individually mounted rear wheels, a plurality of individually mounted forward wheels, means to mount the forward wheels for steering motion, means to steer the forward wheels, sockets on the forward wheel mounting means, mounting means on the frame extending into the sockets, and blocks of yielding non-metallic material in the sockets.

5. A vehicle having a plurality of individually mounted rear wheels, a plurality of individually mounted forward wheels, means to mount the forward wheels for steering motion, means to steer the forward wheels, sleeves on the forward wheel mounting means to journal the same for movement in vertical planes, recesses on the sleeves, mounting means on the frame cooperating with the recesses, blocks of yielding non-metallic material in the recesses and interengaging means between the blocks and the respective recesses and mounting means.

ALFRED F. MASURY.